(12) United States Patent
Renkis

(10) Patent No.: US 10,084,995 B2
(45) Date of Patent: *Sep. 25, 2018

(54) SYSTEMS AND METHODS FOR AN AUTOMATED CLOUD-BASED VIDEO SURVEILLANCE SYSTEM

(71) Applicant: Sensormatic Electronics, LLC, Westford, MA (US)

(72) Inventor: Martin A. Renkis, Nashville, TN (US)

(73) Assignee: SENSORMATIC ELECTRONICS, LLC, Westford, MA (US)

( * ) Notice: Subject to any disclaimer, the term of this patent is extended or adjusted under 35 U.S.C. 154(b) by 89 days.

This patent is subject to a terminal disclaimer.

(21) Appl. No.: 14/845,423

(22) Filed: Sep. 4, 2015

(65) Prior Publication Data

US 2015/0381949 A1 Dec. 31, 2015

Related U.S. Application Data

(63) Continuation-in-part of application No. 14/249,687, filed on Apr. 10, 2014.

(51) Int. Cl.
*H04N 7/18* (2006.01)
*G06K 9/00* (2006.01)
(Continued)

(52) U.S. Cl.
CPC ......... *H04N 7/183* (2013.01); *G06K 9/00718* (2013.01); *G06K 9/00771* (2013.01);
(Continued)

(58) Field of Classification Search
CPC ......... G08B 13/19656; G08B 13/1968; H04L 67/1002; H04L 67/12; H04L 67/2842;
(Continued)

(56) References Cited

U.S. PATENT DOCUMENTS 6,842,674 B2 1/2005 Solomon
7,259,778 B2 8/2007 Arpa et al.
(Continued)

FOREIGN PATENT DOCUMENTS

KR 20130111807 A 10/2013

OTHER PUBLICATIONS

International Search Report and Written Opinion of International Application No. PCT/US2015/024808; dated Jul. 16, 2015, 12 pages.
(Continued)

*Primary Examiner* — Nathnael B Aynalem
(74) *Attorney, Agent, or Firm* — Perkins Coie LLP

(57) ABSTRACT

Systems and methods for setting up a cloud-based video surveillance system with at least one computing device and at least one video camera in a local area network. The at least one computing device has an application program installed and is operable to find out the at least one video camera on the same local area network and connect the at least one video camera to a cloud platform. The video surveillance system is accessible via the at least one computing device locally or other computing device remotely. The video surveillance system is still at work when the at least one computing device is powered off.

27 Claims, 7 Drawing Sheets

(51) Int. Cl.
*H04L 29/08* (2006.01)
*G08B 13/196* (2006.01)

(52) U.S. Cl.
CPC ......... *H04L 67/1002* (2013.01); *H04N 7/181* (2013.01); *G08B 13/19656* (2013.01)

(58) Field of Classification Search
CPC ..... H04L 67/2861; H04L 67/10; H04N 7/181; H04N 5/772; H04N 7/183; H04N 5/23206; H04N 5/23293; G06T 15/205; G06T 7/004
USPC .................... 348/143, 159, 47; 709/219
See application file for complete search history.

(56) References Cited

U.S. PATENT DOCUMENTS

| | | |
|---|---|---|
| 7,379,879 B1 | 5/2008 | Sloo |
| 7,675,520 B2 | 3/2010 | Gee et al. |
| 7,944,454 B2 | 5/2011 | Zhou et al. |
| 8,233,660 B2 | 7/2012 | Fritsch et al. |
| 8,284,254 B2 | 10/2012 | Romanowich et al. |
| 8,311,983 B2 | 11/2012 | Guzik |
| 8,395,664 B2 | 3/2013 | Renkis |
| 8,532,820 B1 | 9/2013 | Sampath |
| 8,559,914 B2 | 10/2013 | Jones |
| 8,639,644 B1 * | 1/2014 | Hickman .............. G06N 3/008 700/245 |
| 8,718,837 B2 | 5/2014 | Wang et al. |
| 8,721,197 B2 | 5/2014 | Miyahara et al. |
| 8,745,086 B2 | 6/2014 | Cardno et al. |
| 8,751,043 B2 | 6/2014 | Guo et al. |
| 8,811,697 B2 | 8/2014 | Sofka et al. |
| 8,903,551 B2 | 12/2014 | Ei-Essawy et al. |
| 9,011,607 B2 | 4/2015 | Luca et al. |
| 9,058,706 B2 | 6/2015 | Cheng |
| 9,061,561 B2 | 6/2015 | Kikuchi et al. |
| 9,216,509 B2 | 12/2015 | Renkis |
| 9,405,979 B2 | 8/2016 | Renkis |
| 9,407,879 B2 | 8/2016 | Renkis |
| 9,407,880 B2 | 8/2016 | Renkis |
| 9,420,238 B2 | 8/2016 | Renkis |
| 9,426,428 B2 | 8/2016 | Renkis |
| 9,438,865 B2 | 9/2016 | Renkis |
| 2004/0030571 A1 | 2/2004 | Solomon |
| 2004/0143602 A1 | 7/2004 | Ruiz et al. |
| 2005/0055330 A1 | 3/2005 | Britton et al. |
| 2007/0152807 A1 | 7/2007 | Huang et al. |
| 2007/0159323 A1 | 7/2007 | Rockefeller et al. |
| 2009/0087161 A1 | 4/2009 | Roberts et al. |
| 2010/0090841 A1 | 4/2010 | Zhang et al. |
| 2010/0274816 A1 | 10/2010 | Guzik |
| 2011/0018998 A1 | 1/2011 | Guzik |
| 2011/0034209 A1 | 2/2011 | Rubinsky et al. |
| 2011/0090334 A1 | 4/2011 | Hicks et al. |
| 2011/0256886 A1 | 10/2011 | Velusamy |
| 2011/0288684 A1 | 11/2011 | Farlow et al. |
| 2011/0316697 A1 | 12/2011 | Krahnstoever et al. |
| 2012/0113121 A1 | 5/2012 | Luo et al. |
| 2012/0114296 A1 | 5/2012 | Luo et al. |
| 2012/0146789 A1 | 6/2012 | Luca et al. |
| 2012/0163657 A1 | 6/2012 | Shellshear |
| 2012/0262576 A1 | 10/2012 | Sechrist et al. |
| 2012/0282884 A1 | 11/2012 | Sun |
| 2012/0310836 A1 | 12/2012 | Eden et al. |
| 2013/0021640 A1 * | 1/2013 | Tamura .............. H04N 1/00217 358/1.14 |
| 2013/0027552 A1 | 1/2013 | Guzik |
| 2013/0030875 A1 | 1/2013 | Lee et al. |
| 2013/0039542 A1 | 2/2013 | Guzik |
| 2013/0063489 A1 | 3/2013 | Hourie et al. |
| 2013/0085625 A1 | 4/2013 | Wolfe et al. |
| 2013/0102283 A1 | 4/2013 | Lau et al. |
| 2013/0141543 A1 | 6/2013 | Choi et al. |
| 2013/0166621 A1 | 6/2013 | Zhu |
| 2013/0166711 A1 | 6/2013 | Wang et al. |
| 2013/0188031 A1 | 7/2013 | Park et al. |
| 2013/0197718 A1 | 8/2013 | Lee et al. |
| 2013/0226655 A1 | 8/2013 | Shaw |
| 2013/0242107 A1 * | 9/2013 | Huang .................. H04N 7/181 348/159 |
| 2013/0289858 A1 | 10/2013 | Mangiat et al. |
| 2013/0290234 A1 | 10/2013 | Harris et al. |
| 2013/0338525 A1 | 12/2013 | Allen |
| 2014/0085501 A1 * | 3/2014 | Tran .................. H04N 5/23238 348/222.1 |
| 2014/0122702 A1 | 5/2014 | Jung et al. |
| 2014/0122720 A1 | 5/2014 | Jung et al. |
| 2014/0123325 A1 | 5/2014 | Jung et al. |
| 2014/0192159 A1 | 7/2014 | Chen et al. |
| 2014/0258444 A1 * | 9/2014 | Joe ...................... H04L 67/2814 709/217 |
| 2014/0266669 A1 | 9/2014 | Fadell et al. |
| 2014/0307076 A1 | 10/2014 | Deutsch |
| 2014/0310186 A1 | 10/2014 | Ricci |
| 2014/0333615 A1 | 11/2014 | Ramalingam et al. |
| 2014/0340510 A1 | 11/2014 | Ihlenburg et al. |
| 2014/0365273 A1 | 12/2014 | Hurewitz |
| 2015/0022664 A1 | 1/2015 | Pflug et al. |
| 2015/0022666 A1 * | 1/2015 | Kay ...................... H04L 67/025 348/159 |
| 2015/0058447 A1 | 2/2015 | Albisu |
| 2015/0127191 A1 | 5/2015 | Misra et al. |
| 2015/0149392 A1 | 5/2015 | Bolich |
| 2015/0221193 A1 | 8/2015 | Pragada |
| 2015/0248503 A1 | 9/2015 | Glunz et al. |
| 2015/0296186 A1 | 10/2015 | Renkis |
| 2015/0298315 A1 | 10/2015 | Shick et al. |
| 2015/0364021 A1 | 12/2015 | Ur |
| 2015/0381417 A1 | 12/2015 | Renkis |
| 2015/0381943 A1 | 12/2015 | Renkis |
| 2015/0381949 A1 | 12/2015 | Renkis |

OTHER PUBLICATIONS

Extended European Search Report for European Application No. 15777105.6; dated Mar. 7, 2017: 7 pages.

* cited by examiner

SYSTEMS AND METHODS FOR AN AUTOMATED CLOUD-BASED VIDEO SURVEILLANCE SYSTEM

CROSS-REFERENCES TO RELATED APPLICATIONS

This application claims priority from a co-pending US application; it is a continuation-in-part of U.S. application Ser. No. 14/249,687 filed Apr. 10, 2014, which is incorporated by reference herein in its entirety.

BACKGROUND OF THE INVENTION

1. Field of the Invention

The present invention relates to cloud-based systems and methods for connecting a device with visual sensors to a cloud platform for surveillance, storage, analytics and management.

2. Description of the Prior Art

It is known in the prior art that a video surveillance system can be set up at a location with a local recorder and server besides cameras. There is a big up-front investment for this type of video surveillance. In recent years, with anything as a service (XaaS) getting popular, video surveillance systems are installed with minimum hardware components—cameras or other sensors. Everything else, such as streaming, storage, management, and analytics, is moved to the cloud. These services are sold as a service by subscription with a monthly or yearly payment. Still, it is a dedicated service and a big expense in a long term.

Recent years, the vision of the Internet of Things (IoT) connects more and more things to the internet and puts more intelligence and sensors into the connected systems, from industrial machines to home appliances to automobiles. Apparently, there is a need for people to keep connected with everything they are concerned with no matter where they are and what they are doing. For example, an Xbox gamer may need to keep an eye on a sleeping child while he is playing games. The present invention provides a technology to enable users to set up their own video surveillance system on top of their existing smart devices. For example, gamers, TV viewers, drivers and others are able to set up a video surveillance system within their homes or cars by themselves with their game consoles, smart TVs, smart cars, or other smart devices. Therefore, gamers, TV viewers, drivers can do what they want and still keep connected with other things happening around them. There is prior art for setting up video surveillance system, however, the video surveillance system only works when the server is on. The present invention provides a technology to enable users to access the video surveillance system remotely when the existing smart device is powered off.

As for future surveillance, the vision is that more and more devices are to be embedded with visual sensors and connected to the internet, which can be called the Internet of Things Videos (IoTV). Video and image data as well as other sensory data are collected for monitoring and advanced analytics and intelligent operation so that smart surveillance is provided for various environments. For example, visual sensors can be embedded in thermostats, ovens, refrigerators, doorbells, toys, cars, and other smart devices.

Every smart device usually comes with an application program ("app") developed by the device or appliance manufacturer. Currently, there is usually an app associated with a specific video device for remote monitoring and communication. For example, Dropcam camera has its own app for cloud setup and remote view, and a Skybell video doorbell has its own mobile app. There is a need for a universal application which recognizes all smart devices with in a local area network; thus, all smart devices in the local area network can be connected to one cloud platform and accessed via one app.

By way of example, prior art documents include:

U.S. Pat. No. 8,559,914 for "Interactive personal surveillance and security (IPSS) system" by inventor Jones filed Jan. 16, 2009, describes an interactive personal surveillance and security (IPSS) system for users carrying wireless communication devices. The system allows users carrying these devices to automatically capture surveillance information, have the information sent to one or more automated and remotely located surveillance (RLS) systems, and establish interactivity for the verification of determining secure or dangerous environments, encounters, logging events, or other encounters or observations. This IPSS is describes to enhance security and surveillance by determining a user's activities, including (a.) the user travel method (car, bus, motorcycle, bike, snow skiing, skate boarding, etc.); (b.) the user motion (walking, running, climbing, falling, standing, lying down, etc.); and (c.) the user location and the time of day or time allowance of an activity. When user submits uploaded (or directly sent) surveillance information to the public server, the surveillance videos, images and/or audio includes at least one or more of these searchable areas, location, address, date and time, event name or category, and/or name describing video.

U.S. Pat. No. 8,311,983 for "Correlated media for distributed sources" by inventor Guzik filed Dec. 14, 2009 (related to U.S. Publications 2010/0274816, 2011/0018998, 2013/0027552 and 2013/0039542) discloses method embodiments associating an identifier along with correlating metadata such as date/timestamp and location. The identifier may then be used to associate data assets that are related to a particular incident. The identifier may be used as a group identifier on a web service or equivalent to promote sharing of related data assets. Additional metadata may be provided along with commentary and annotations. The data assets may be further edited and post processed. Correlation can be based on multiple metadata values. For example, multiple still photos might be stored not only with date/time stamp metadata, but also with location metadata, possibly from a global positioning satellite (GPS) stamp. A software tool that collects all stored still photos taken within a window of time, for example during a security or police response to a crime incident, and close to the scene of a crime, may combine the photos of the incident into a sequence of pictures with which for investigation purposes. Here the correlation is both by time and location, and the presentation is a non-composite simultaneous display of different data assets. Correlating metadata can be based on a set of custom fields. For example, a set of video clips may be tagged with an incident name. Consider three field police officers each in a different city and in a different time zone, recording videos and taking pictures at exactly at midnight on New Year's Day 2013. As a default, a group may be identified to include all users with data files with the same Event ID. A group may also be either a predefined or a self-selecting group, for example a set belonging to a security agency, or a set of all police officers belonging to the homicide division, or even a set of officers seeking to share data regardless of if they are bellowing to an organized or unorganized group.

U.S. Pat. No. 7,379,879 for "Incident reporting system and method" by inventor Sloo filed Feb. 26, 1999, describes a computer-based method of collecting and processing incident reports received from witnesses who observe incidents such as criminal acts and legal violations. The method automates the collection and processing of the incident reports and automatically sends the incident reports to the appropriate authority so that the observed incidents can be acted on in an appropriate manner. For example, a witness may be equipped with a video input system such as a personal surveillance camera and a display. When the witness encounters an incident such as a suspect committing a crime, the video input system would automatically recognize the suspect from the video input and could then display records for the suspect on the witness's hand held readout without revealing the suspect's identity. The witness would not need to know the identity of the suspect to observe the incident relating to the suspect. Such a system may overcome some of the problems associated with publicly revealing personal data.

U.S. Publication 2009/0087161 for "Synthesizing a presentation of a multimedia event" by inventors Roberts, et al. filed Sep. 26, 2008, discloses a media synchronization system includes a media ingestion module to access a plurality of media clips received from a plurality of client devices, a media analysis module to determine a temporal relation between a first media clip from the plurality of media clips and a second media clip from the plurality of media clips, and a content creation module to align the first media clip and the second media clip based on the temporal relation, and to combine the first media clip and the second media clip to generate the presentation. Each user who submits content may be assigned an identity (ID). Users may upload their movie clips to an ID assignment server, attaching metadata to the clips as they upload them, or later as desired. This metadata may, for example, include the following: Event Name, Subject, Location, Date, Timestamp, Camera ID, and Settings. In some example embodiments, additional processing may be applied as well (e.g., by the recognition server and/or the content analysis sub-module). Examples of such additional processing may include, but are not limited to, the following: Face, instrument, or other image or sound recognition; Image analysis for bulk features like brightness, contrast, color histogram, motion level, edge level, sharpness, etc.; Measurement of (and possible compensation for) camera motion and shake.

U.S. Publication 2012/0282884 for "System and method for the emergency voice and image e-mail transmitter device" by inventor Sun filed May 5, 2011, describes a voice and image e-mail transmitter device with an external camera attachment that is designed for emergency and surveillance purposes is disclosed. The device converts voice signals and photo images into digital format, which are transmitted to the nearest voice-image message receiving station from where the digital signal strings are parsed and converted into voice, image, or video message files which are attached to an e-mail and delivered to user pre-defined destination e-mail addresses and a 911 rescue team. The e-mail also includes the caller's voice and personal information, photo images of a security threat, device serial number, and a GPS location map of the caller's location. When the PSU device is initially used, the user needs to pre-register personal information and whenever a digital signal string is transmitted out from the PSU device it will include these personal information data plus a time code of the message being sent, the PSU device's unique serial number, and the GPS generated location code, etc. which will all be imbedded in the PSU e-mail.

U.S. Publication 2012/0262576 for "Method and system for a network of multiple live video sources" by inventors Sechrist, et al. filed Mar. 15, 2012, discloses a system and a method that operate a network of multiple live video sources. In one embodiment, the system includes (i) a device server for communicating with one or more of the video sources each providing a video stream; (ii) an application server to allow controlled access of the network by qualified web clients; and (iii) a streaming server which, under direction of the application server, routes the video streams from the one or more video sources to the qualified web clients.

Geo-location information and contemporaneous timestamps may be embedded in the video stream together with a signature of the encoder, providing a mechanism for self-authentication of the video stream. A signature that is difficult to falsify (e.g., digitally signed using an identification code embedded in the hardware of the encoder) provides assurance of the trustworthiness of the geo-location information and timestamps, thereby establishing reliable time and space records for the recorded events. In general, data included in the database may be roughly classified into three categories: (i) automatically collected data; (ii) curated data; and (iii) derivative data. Automatically collected data includes, for example, such data as reading from environmental sensors and system operating parameters, which are collected as a matter of course automatically. Curated data are data that are collected from examination of the automatically collected data or from other sources and include, for example, content-based categorization of the video streams. For example, detection of a significant amount of motion at speeds typical of automobiles may suggest that the content is "traffic." Derivative data includes any data resulting from analysis of the automatically collected data, the curated data, or any combination of such data. For example, the database may maintain a ranking of video source based on viewership or a surge in viewership over recent time period. Derivative data may be generated automatically or upon demand.

None of the prior art provides solutions for cloud-based analytics for smart surveillance as provided by the present invention.

SUMMARY OF THE INVENTION

The present invention relates to cloud-based video surveillance system providing a way for users to set up a smart cloud-based surveillance system with various smart devices.

The present invention provides a cloud-based video surveillance system including: at least one local computing device constructed and configured in network communication with at least one input capture device over a local network. The at least one device has at least one visual sensor embedded. The at least one local computing device is operable to query a network device (e.g. a router) and identify the at least one input capture device on the same network, and connect the at least one input capture device to a cloud platform. The at least one input capture device communicates input data to the cloud platform. The platform may provide data storage and analytics. The cloud-based surveillance system can be viewed on the at least one local computing device. The video surveillance system can also be viewed on other authorized computing devices locally and/or remotely, such as laptops, personal computers, tablets, smartphones and other similar devices. Especially, when the at least one computing device is powered off, authorized users can still access to the cloud-based surveillance system via these other authorized computing devices remotely.

These and other aspects of the present invention will become apparent to those skilled in the art after a reading of the following description of the preferred embodiment when considered with the drawings, as they support the claimed invention.

DETAILED DESCRIPTION

Figure 1:
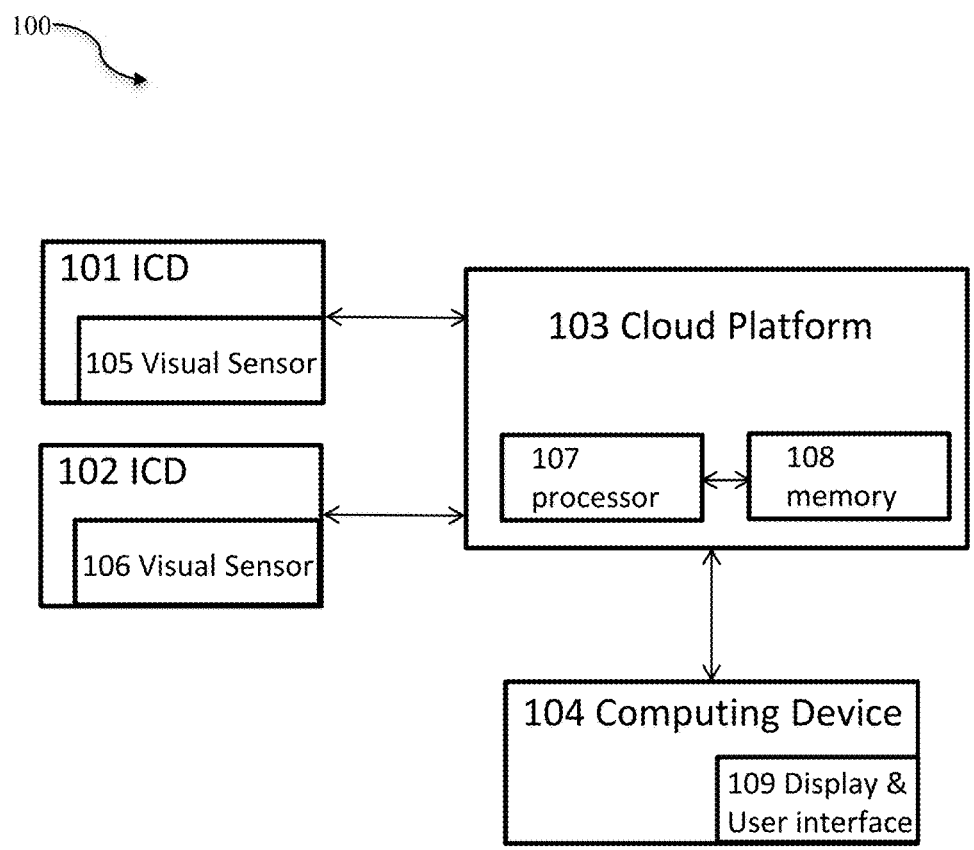
FIG. 1 is a block diagram of an exemplary system consistent with the invention.

Referring now to the drawings in general, the illustrations are for the purpose of describing a preferred embodiment of the invention and are not intended to limit the invention thereto.

The present invention relates to cloud-based surveillance systems and methods for providing at least one server computer in communication with a network for providing centralized and/or distributed cloud-based analytics of inputs captured from remote input capture devices for providing analyzed inputs that are stored in the cloud-based system database and accessible remotely and securely for providing security for at least one surveillance environment, surveillance event, and/or surveillance target. Related secure wired and/or wireless networks and systems, and methods for using them are disclosed in U.S. Publications 2014/0071289, and U.S. Pat. Nos. 7,784,080, 7,719,567, 7,954,129, 7,728,871, 7,730,534, 8,395,664, and 8,752,106, each of which is incorporated herein by reference in its entirety.

Although "cloud computing" can generically be applied to any software as a service or to services interfacing through the Internet, in the present invention, "cloud-based" computing refers to distributed computing among at least one server or more than one server.

The present invention provides a cloud-based video surveillance system including: at least one local computing device constructed and configured in network communication with at least one input capture device over a local network. The at least one device has at least one visual sensor embedded. The at least one local computing device is operable to query a network device (e.g. a router) and identify the at least one input capture device on the same network, and connect the at least one input capture device to a cloud platform. The at least one input capture device communicates input data to the cloud platform. The platform may provide data storage and analytics. The cloud-based surveillance system can be viewed on the at least one local computing device. The video surveillance system can also be viewed on other authorized computing devices locally and/or remotely, such as laptops, personal computers, tablets, smartphones and other similar devices. Especially, when the at least one computing device is powered off, authorized users can still access to the cloud-based surveillance system via these other authorized computing devices remotely.

In one embodiment, the at least one local computing device can be a game console, for example, Xbox One. The game console includes a processor and a memory. One or more video cameras can be placed anywhere within a residential place. The game console and the one or more video cameras are connected to a local communication network via a router wired or wireless. An application program for setting up a surveillance system is installed on this game console. The application-program-equipped game console communicates to the router and identify all the video cameras connected to the local communication network via the router, and provides identifiers of the one or more video cameras to a database accessible by the game console and connects them to a cloud platform as well. The one or more video cameras will then communicate video surveillance data directly to the cloud platform. Thus, a cloud-based video surveillance system is set up. A user can view the video surveillance data in live and recorded formats from the display connected with the game console or remotely from other compatible devices, such as smartphones, notebooks, tablets, and other similar devices.

A user having an Xbox login account is able to download, install and activate the application program to the Xbox One game console system. The user can place multiple cameras in a certain local area network, each camera has its own identifier, but the user can access these multiple cameras with one login over the cloud platform. The system and method of the present invention provides for at least one game system and corresponding account(s) are operable as video surveillance within the communication network after at least one camera, at least one video input device, or at least one input capture device (ICD) is installed and activated over the same local network. The cloud platform is then accessible for view and control access by one or other communication device locally and/or remotely with the Xbox login account, whether the at least one game system is being played or not, i.e., if the at least one game system is actively in use or not. Especially when the Xbox game console is powered off, a user can still access to the cloud-based video surveillance system via other computing devices with the Xbox login.

By way of example and not limitation, with the video surveillance system, gamers are able to play and at the same time keep an eye on other things around home, for example, keep watch on a sleeping child in a different room or a cooking pot in the kitchen, or check out who is ringing doorbell. Even when the game console is powered off, the video surveillance system is still at work. Authorized users with the Xbox login account can access the video surveillance system remotely via other computing devices and receive messages and alerts. Users can also choose to record and store videos on the cloud platform for a certain period, for example, a week or a month. So the cloud platform is operable to record and store video surveillance data, and to automatically deliver messages and/or alerts to mobile communication devices and/or computers associated with the Xbox account login and authorized user(s).

In another example, the at least one local computing device is a smart TV. A household video surveillance system can be set up by the smart TV with an application program when one or more cameras placed within the household are connected to the same local communication network as the smart TV. Thus, a user is able to keep connected with things happening in the surveillance area while watching TV programs. Even when the smart TV is turned off, the video surveillance system is still accessible via other computing devices and the user can receive emails and/or alerts regarding the household video surveillance system.

Yet in another embodiment, the at least one local computing device is a smart car with a computing component and a network device. One or more cameras installed in the car are communicatively connected with the communication component. An application program for setting up a car video surveillance system may be downloaded, installed and activated on the computing component. The computing component communicates with the network device and to identify all the one or more video cameras within the car. Then the computing component adds identifiers of the one or more video cameras to a cloud platform and configures the one or more video cameras for communicating with the cloud platform as well. The cloud platform is operable to provide storage analytics services to support visual intelligence by the system.

With such a video surveillance system, a driver is able to record videos from different angles of the car for insurance claim issues in case an accident happens to the car. Moreover, even when the smart car is turned off and no driver is in the smart car, authorized drivers can still access to the car video surveillance system via smartphones, notebooks, tablets and other similar devices remotely. For example, a driver may park the car in a parking lot and go to a shopping center, the driver is able to view video surveillance data remotely and receive alerts and/or messages as to what happens to the car, for example an impact from another car or any suspicious activities around the car.

With the development of IoTV, various devices embedded with visual sensors can be used to monitor and control the mechanical, electrical and electronic systems used in various types of buildings (e.g., public and private, industrial, institutions, or residential). Home automation systems, like other building automation systems, are typically used to control lighting, heating, ventilation, air conditioning, appliances, communication systems, entertainment and home security devices to improve convenience, comfort, energy efficiency, and security.

Within a residential location, various smart appliances have communication capability. For example, a smart refrigerator has embedded visual sensors are able to residents if what groceries they still have. Some smart refrigerators can even tell what items they have and what items they need to buy and send reminders to the residents via phone messages and/or emails. For example, a doorbell embedded with a visual sensor can record who come to the front door or the view field of the visual sensor. Such smart visual-sensor-equipped doorbells even have advanced analytics functions such as facial recognition, event recognition, etc., and send alerts to residents who are not home via phone message and/or email. If a resident has multiple such smart devices, it will be more convenient to connect and access all these smart devices under one account.

In one embodiment, a local computing device with a specific application program installed query a network device (e.g. a router) over a home network and finds all the smart devices connected to home network via the network device. The local computing device connects all the smart device to a cloud platform. Thus, a smart home surveillance system is set up. A resident can access the all these smart devices under one authorized account via the local computing device or other remote computing device. The local computing device and other remote computing devices can be personal computers, laptops, smartphones, tablets, and other similar devices. Specifically, when the local computing device is powered off, the smart home surveillance system is still accessible through other authorized computing devices.

In one embodiment, one authorized account is associated with one surveillance system and the cloud platform. Each of the visual sensors embedded on each of the devices has a unique identifier, each of the connected device also has a unique identifier. All of the individual device accounts and visual sensor accounts are added under the authorized account. Thus, all the devices and visual sensors are accessed with one login.

Video cameras used in the current invention are either generic video camera devices, or smart Input Capture Devices (ICDs) which have embedded cameras, including but not limited to smart phones, tablet computers, mobile communication devices, portable computers, wearable computers and wearable input capture and communication devices. Video cameras used in the current invention can be wired or wireless. In any case, the video sensors in a smart ICD have unique identifiers and all the smart ICDs have unique identifiers as well.

In one embodiment, the video cameras further include additional functionality, for example two-way audio, night vision, temperature sensitive video capture, etc. Also preferably, the video cameras in this invention are equipped with a time-stamp function that embeds or associates a date and time data with an image or video. Authentication, messages, and/or alerts from the cloud platform also provide an associated date and time data in one embodiment of the present invention.

In some embodiments, the video cameras may provide geographic location information and/or Global Positioning System (GPS) information to be embedded within videos and images sent from the video cameras over the network to the cloud platform. Similarly, the messages and/or alerts from the cloud platform also preferably have GPS information.

Video and/or image inputs are indexed, organized, stored, and available for access by authorized users via the network through a website or portal or Application Program Interface (API). The at least one local computing device and other authorized computing devices are preferably registered with the system through an API, an app, or software application for accessing the video surveillance system.

The at least one local computing device and other authorized computing devices are selected from game consoles (e.g. Xbox), smart TVs, smart cars, smart appliances, smart environmental detection devices, smart environmental monitoring and control devices, personal computers, laptops, tablets, smartphones, and/or other similar smart devices.

The cloud platform provides access to video surveillance data in both live and recorded formats. A user may select an amount of video and an amount of time period for storage on the cloud platform. In commercial embodiments, payment alternatives providing for varied levels of access to the system, data storage, analytics, intelligence, reports, etc. are included with user profiles that are stored by the system.

The cloud platform also provides visual intelligence for the video surveillance system. Basic analytics may be provided for free, for example motion detection. Authorized users will receive an alert or message when there is a condition detected. The user may also select certain types of advanced cloud-based analytics service at certain prices, for example, facial recognition, event recognition, predictive warning, voice reminders, etc. The cloud platform will then send messages and/or alerts when there are changes in state.

Optionally, the software application and/or the computing devices automatically verifies and authenticates a user, for example using biometric authentication, such as facial recognition, fingerprint, etc., and/or using a user identification and passcode or personal identification number, or other authentication mechanisms.

In preferred embodiments of the present invention, an application program is downloaded, installed and activated on the at least one local computing device for setting up a video surveillance system. A graphical user interface is provided by the application program on the at least one local computing device and other authorized computing devices with their corresponding displays to provide secure, authorized access to the video and/or image contents associated with the video surveillance system.

Also, preferably, the application program on the at least one local computing device and other remote computing devices provide an automated sharing feature that provides for single click select and activation of media sharing of the selected inputs captured. In one embodiment, the single click select and activation of media sharing of the selected video and/or image provides time and identity information.

In some embodiments, the smart devices embedded with visual sensors provide some intelligent functions locally besides recording and streaming videos. For example, a doorbell with embedded visual sensor has the ability to recognize faces and events in the view field of the visual sensor. For example, if the visual sensor embedded in an oven finds out the oven light is left on after the cooking is done, it can turn off the oven light itself. The cloud platform is able to do performance prediction and generate commands and provide centralized coordination and other intelligence functions among all the smart devices within such a surveillance system.

Video cameras and smart devices are equipped with wired and/or wireless communication capabilities to a local router. ZigBee, Wi-Fi, or mesh network technologies may be applied to certain surveillance system. In one embodiment, all the devices are communicating with the cloud platform, there is no communication between different devices with a surveillance system. In another embodiment, there is machine-to-machine communication between devices on top of a centralized communication to the cloud platform. In this situation, the smart devices or ICDs have local intelligent analytics and communicate command and control to other input capture devices within a surveillance system over communication network. For example, if a thermostat with an embedded visual sensor finds out the light is on during the day when no one is at home, it can turn off the light. For example, if the doorbell embedded with visual sensors finds out authorized residents are walking towards the door with many grocery bags, it then unlocks the door for the authorized residents.

The network device can be a wireless/wired router or an antenna. The at least one local computing device equipped with the application program has polling capabilities and is enabled to access the network device. The network device has records of all connected device, the at least computing device is operable to poll and identify all the devices that are connected the network device over a communication network. The polling, querying and identifying capabilities are disclosed in U.S. Pat. No. 7,508,418, which in incorporated herein by reference in its entirety. The communication network can be a Wide Area Network (WAN), a Local Area Network (LAN), or a Personal Area Network (PAN).

The present invention provides a cloud-computing surveillance system including: at least one server computer having a processor and a memory, constructed and configured in network-based communication with a multiplicity of remote input devices having input capture mechanisms; inputs captured by the remote input devices transmitted within a secure messaging communicated over the network; wherein the inputs are received, authenticated, and indexed by the at least one server computer and stored in a corresponding database; wherein the inputs are processed and analyzed based upon at least one profile for a surveillance environment, a surveillance event, and/or a surveillance target, for providing a near-real-time analysis of the inputs to determine a status of security. The at least one profile associated with the surveillance environment, surveillance event, and/or surveillance target may include security level (low, medium, high), alert level, time interval for review for change, authorized remote input device and/or user information, and combinations thereof. The status is selected from: normal, questionable, alert, urgent, disaster, injury, and any descriptor or indicator of the level and condition of the environment, event, and/or target compared with predetermined conditions.

The system may further include a priority and a profile associated with the inputs for automatically associating the inputs with the corresponding surveillance environment, surveillance event, and/or surveillance target. The profile associated with the inputs may include user and/or owner identifier, equipment identifier, communication security level, and combinations thereof. In one embodiment, the secure messaging includes internet protocol (IP) messaging of data packet(s) including the inputs, and may further include encryption, digital fingerprinting, watermarking, media hashes, and combinations thereof. As described in the following detailed description of the invention, the inputs are selected from images, audio, and/or video; more particularly, the input is selected from live streaming video, real-time images and/or audio, previously recorded video, previously captured images and/or audio, and combinations thereof. The remote input devices include mobile phones, smart phones, tablet computers, portable computers, mobile communication devices, wearable input capture devices, and/or security cameras. By way of example and not limitation, a wearable input capture device may be removable, portable devices such as eyewear (like Google Glass), headwear, wristwear, etc.

The analysis is performed by a virtualized or cloud-based computing system and provides for remote access of analyzed inputs, and involves at least one rules engine for transforming individual inputs into analyzed content. The analyzed content may include inputs from more than one remote input device. Additionally, the analyzed content may be generated by transforming the original inputs by the at least one server computer automatically assembling input fragments into an integrated content file, and wherein the original input is stored and associated with the integrated content file.

In one embodiment of the present invention, the authentication includes confirmation of global positioning system (GPS) location of each of the remote input devices providing inputs and matching the GPS location with corresponding at least one predetermined surveillance environment, surveillance event, and/or surveillance target. Preferably, the analysis includes authentication of the input device with a device identification, a user identification, a geographic location, and a time associated with the input and the predetermined surveillance environment, surveillance event, and/or surveillance target.

At the at least one server computer, the authenticated inputs are automatically tagged, combined, grouped, edited, and analyzed by the cloud-based system according to the predetermined surveillance environment, surveillance event, and/or surveillance target. Also, the input is verified by authenticating the at least one input device and/or its corresponding user and the input is analyzed to confirm that there has been no alteration, editing, and/or modification to the input prior to its receipt by the at least one server computer.

The present invention also provides methods for the system described in the foregoing, including the steps of: providing a cloud-based or virtualized computing system having at least one server computer with a processor and a memory, constructed and configured in network-based communication with a multiplicity of remote input devices having input capture mechanisms; receiving by the at least one server computer inputs from the remote input devices transmitted within a secure messaging communicated over the network; authenticating the inputs; indexing the inputs by the at least one server computer; and storing the inputs in a corresponding database; processing and analyzing the inputs by the at least one server computer using at least one profile for a surveillance environment, a surveillance event, and/or a surveillance target, for providing a near-real-time analysis of the inputs to determine a status of security. Additional steps may include: providing a priority for the secure messaging; analyzing inputs from more than one remote input device in near real time to provide social security surveillance of the surveillance environment, surveillance event, and/or surveillance target; and/or automatically assembling input fragments into an integrated content file, and wherein the original input is stored and associated with the integrated content file. Also, preferably, the authenticating step includes automatic authentication of the input device and/or its user based upon the combination of a device identification, a user identification, a geographic location, and a time associated with the input and the predetermined surveillance environment, surveillance event, and/or surveillance target.

The present invention systems and methods include a surveillance system for providing automated cloud-based analytics that allows for uploading of captured inputs, authentication of the inputs, and analysis of the inputs to provide real- or near real-time surveillance of a surveillance environment, surveillance event, and/or surveillance target. The surveillance and visual intelligence systems and methods of the present invention include a combination of several key features including input authentication, time, and automated cloud-based analytics relating to the inputs and the surveillance environment, surveillance event, and/or surveillance target.

The authentication is provided with device and/or user with location wherein the input devices provide information including geographic location information and/or global positioning system (GPS) information to be embedded within images and videos and/or included in the messaging from the input devices over the network to the at least one server computer. Additionally, overlay and other techniques may also be used during upload of content, such as, by way of example and not limitation, TDOA, AIA, and RF fingerprinting technologies.

Preferably, the input devices are equipped with a timestamp function that embeds a date and time into an image or video for later authentication, or their messaging provides a date and time associated with the inputs, including images, and/or video.

Additionally, the authentication of users and/or devices through the evaluation of uploaded content, including stenographic techniques such as digital fingerprinting and watermarking, or user-verification techniques such as login or CAPTCHA technologies and biometric scanning.

While some content is considered verified by authenticating a user or device, additional analytics may be performed by the cloud-based system to establish that content has not been modified from its original sources, such as through the use of media hashes. Additionally, after receiving and authenticating multiple sources of information, analytics may allow for the inputs to be aggregated, tagged, combined, edited, and/or grouped.

Although in the prior art, content-based analytics is used in CCTV settings and when verifying that digital content has been unaltered or authenticating a content's source (e.g., copyrighted music, images and videos), it has not been used for distributed, cloud-based social surveillance allowing for a multiplicity of inputs from remote input devices to at least one server computer for analysis of the inputs based upon a predetermined surveillance environment, surveillance event, and/or surveillance target, and more particularly for security surveillance.

Notably, specialized pre-registered devices are not required, but instead the present invention incorporates distributed, and potentially unknown devices, so long as the user, time and location correspond to the predetermined surveillance environment, surveillance event, and/or surveillance target.

Systems and methods of the present invention provide for a multiplicity of remote input devices, by way of example and not limitation, including commercially available devices such as Google glass or glasses or headwear having input capture mechanisms and mobile communication capability, mobile smart phones, cellular phones, tablet computers, gaming devices such as an Xbox Kinect controller, so long as the input device is constructed and configured to capture and share or transmit video and/or images associated with location data, direction, etc. and owners/users with the cloud-based surveillance system. The input information is stored on at least one server computer, in a centralized and/or virtualized central manner, and the input information is indexed, organized, stored, and available for access by authorized users via the network through a website or portal or API. The input device is preferably registered with the system through an app or software application associated with the remote or distributed input devices. While preregistration is not required for the inputs to be associated with at least one surveillance environment, surveillance event, and/or surveillance target, all inputs are required to be authenticated by the system based upon the input device, the input device user, and/or corresponding identification and/or association with the surveillance environment, surveillance event, and/or surveillance target. By way of example and not limitation, a video input is transmitted by a remote input device with an email including the video input as a media attachment within the message; the cloud-based system and its at least one server computer receives the email message, authenticates the email address associated with the device and/or user, and accepts the video. Also the same is provided with MMS or text messaging with video and/or audio and/or image.

In one embodiment of the present invention, method steps include: providing the system as described hereinabove;

providing a software application operating on a remote input device for capturing at least one input including an image, a video, and/or an audio input; activating the software application; capturing the at least one input including an image, a video, and/or an audio input; automatically and/or manually including structural and/or descriptive metadata, including but not limited to unique identifying indicia associated with the input, time, location or geographic information, text and/or audio notation associated with the input, priority flag or indicator, and combinations thereof.

Optionally, the software application and/or the remote input device automatically verifies and authenticates the user of the remote input device, for example using biometric authentication such as facial recognition, fingerprint, etc., and/or using a user identification and passcode or personal identification number, or other authentication mechanisms. Preferably, the authentication information is included with the metadata corresponding to the input(s) and associated therewith as a composite input, and the software application and/or the remote input device automatically transmits the composite input over the network to the cloud-based system and the at least one server computer thereon and is saved in at least one database. In preferred embodiments of the present invention, a user interface is provided on the remote input device(s) or distributed computer device(s) and their corresponding displays to provide secure, authorized access to the composite input and/or to all inputs associated with predetermined surveillance environment, surveillance event, and/or surveillance target stored in the cloud database.

Also, preferably, the software application on the remote input device provides an automated sharing feature that provides for single click select and activation of media sharing of the selected inputs captured. In one embodiment, the single click select and activation of media sharing of the selected inputs captured on that remote input device provides for automatic association of the shared media with at least one email address corresponding to the user and the remote input device.

FIG. 1 illustrates a block diagram of an exemplary system 100 consistent with the invention. As shown in FIG. 1, exemplary system 100 may comprises two ICDs 101, 102, a cloud platform 103 and a computing device 104. The cloud platform 103 are constructed and configured in network communication with the two ICDs 101, 102 and the user device 104. The two ICDs each have a visual sensor 105, 106, respectively. The cloud platform 103 has a processor 107 and a memory 108. The computing device has a display with a user interface 109.

Figure 2:
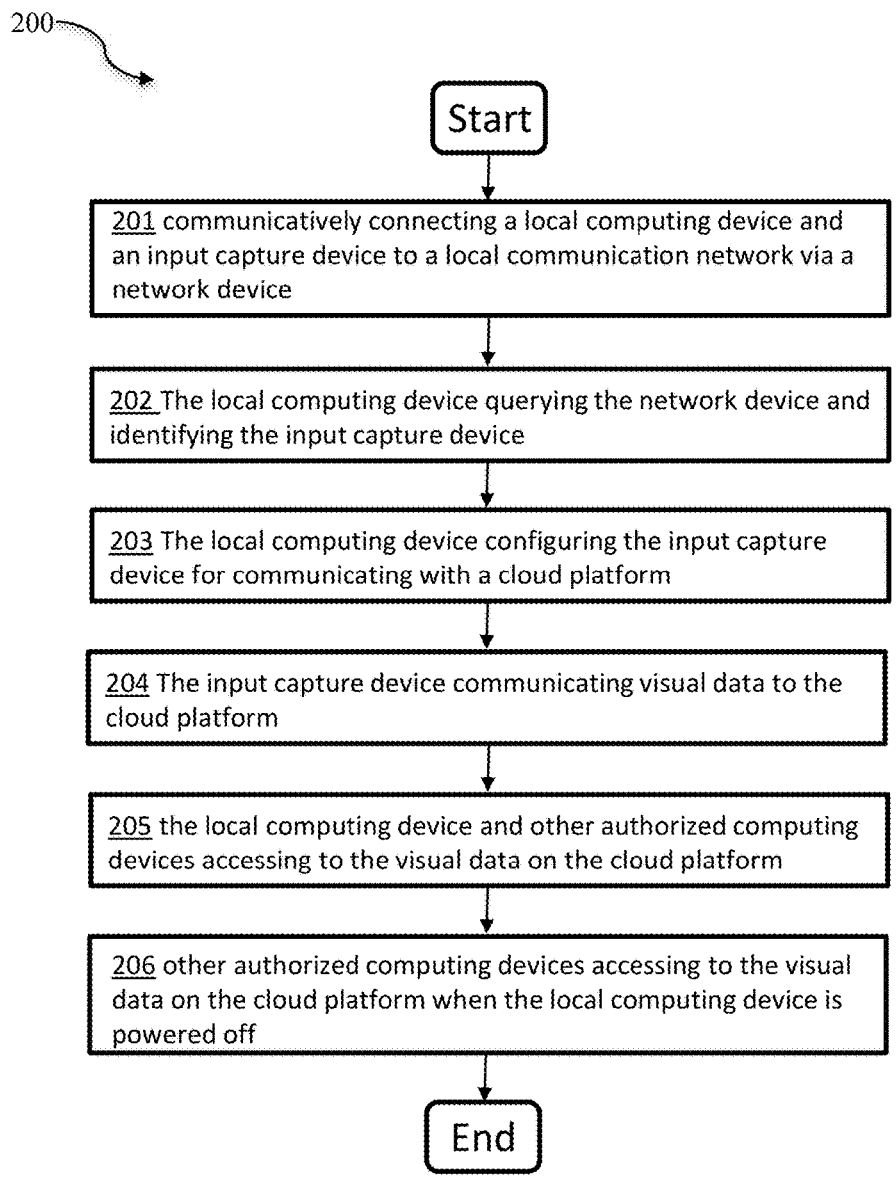
FIG. 2 is a flowchart of a method for providing a cloud-based surveillance system of the present invention.

FIG. 2 is a flowchart 200 illustrating a method for providing a cloud-based surveillance system in the present invention. The method comprises (201) communicatively connecting a local computing device and an input capture device to a local communication network via a network device. The method further comprises (202) the local computing device querying the network device and identifying the input capture device. The method further comprises (203) the local computing device configuring the input capture device for communicating with a cloud platform and (204) the input capture device communicating visual data to the cloud platform. The method further comprises (205) the local computing device and other authorized computing devices accessing to the visual data on the cloud platform and (206) other authorized computing devices accessing to the visual data on the cloud platform when the local computing device is powered off.

Figure 3:
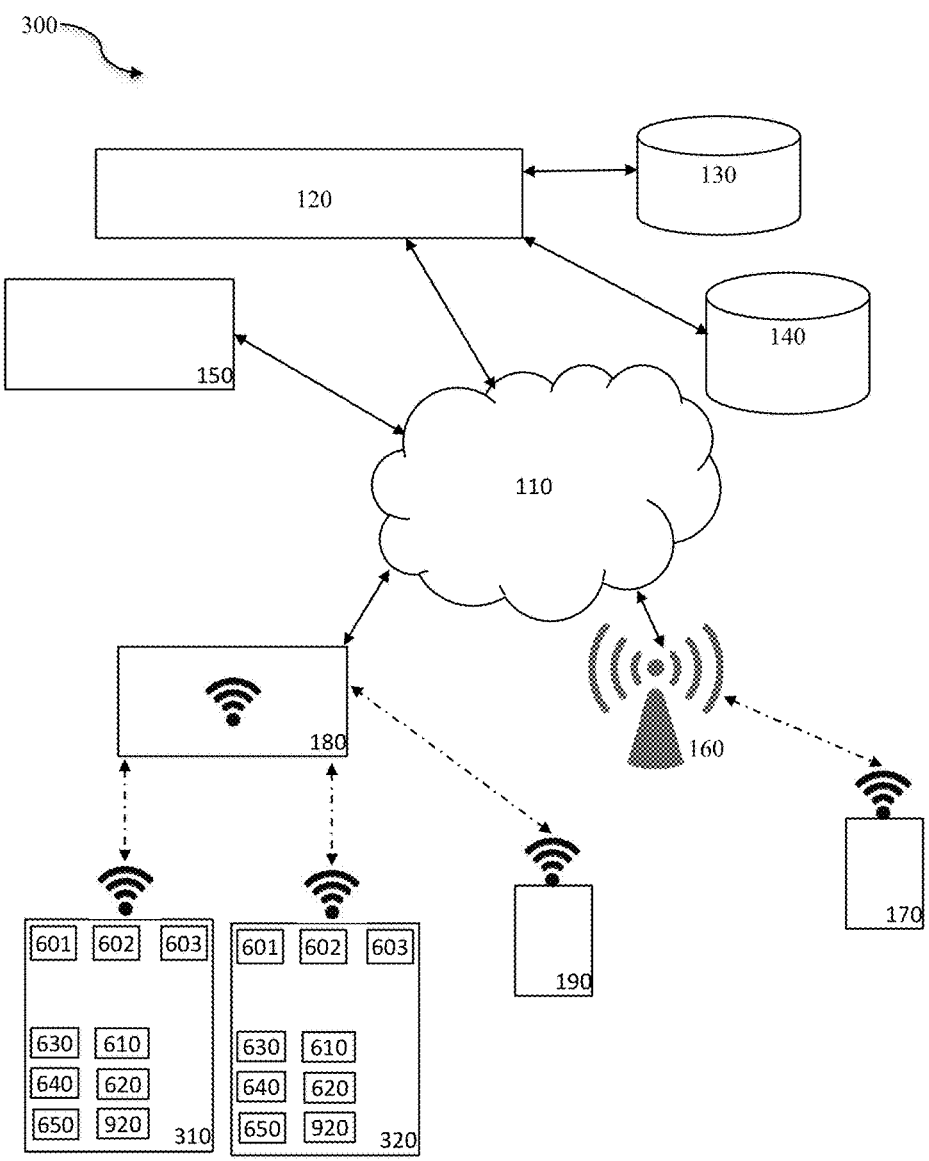
FIG. 3 is a schematic diagram of one embodiment of the invention.
Figure 4:
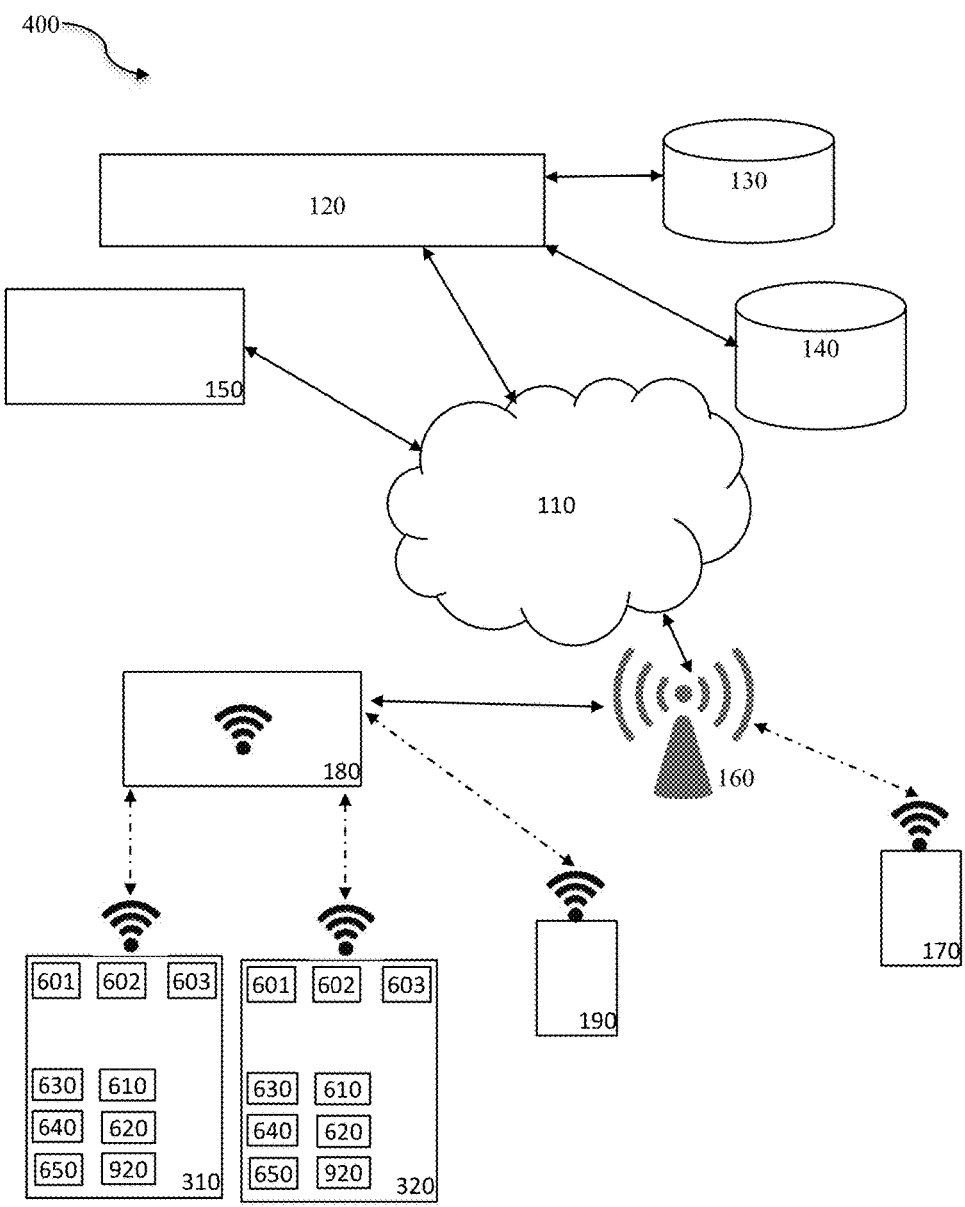
FIG. 4 is a schematic diagram of one embodiment of the invention.
Figure 5:
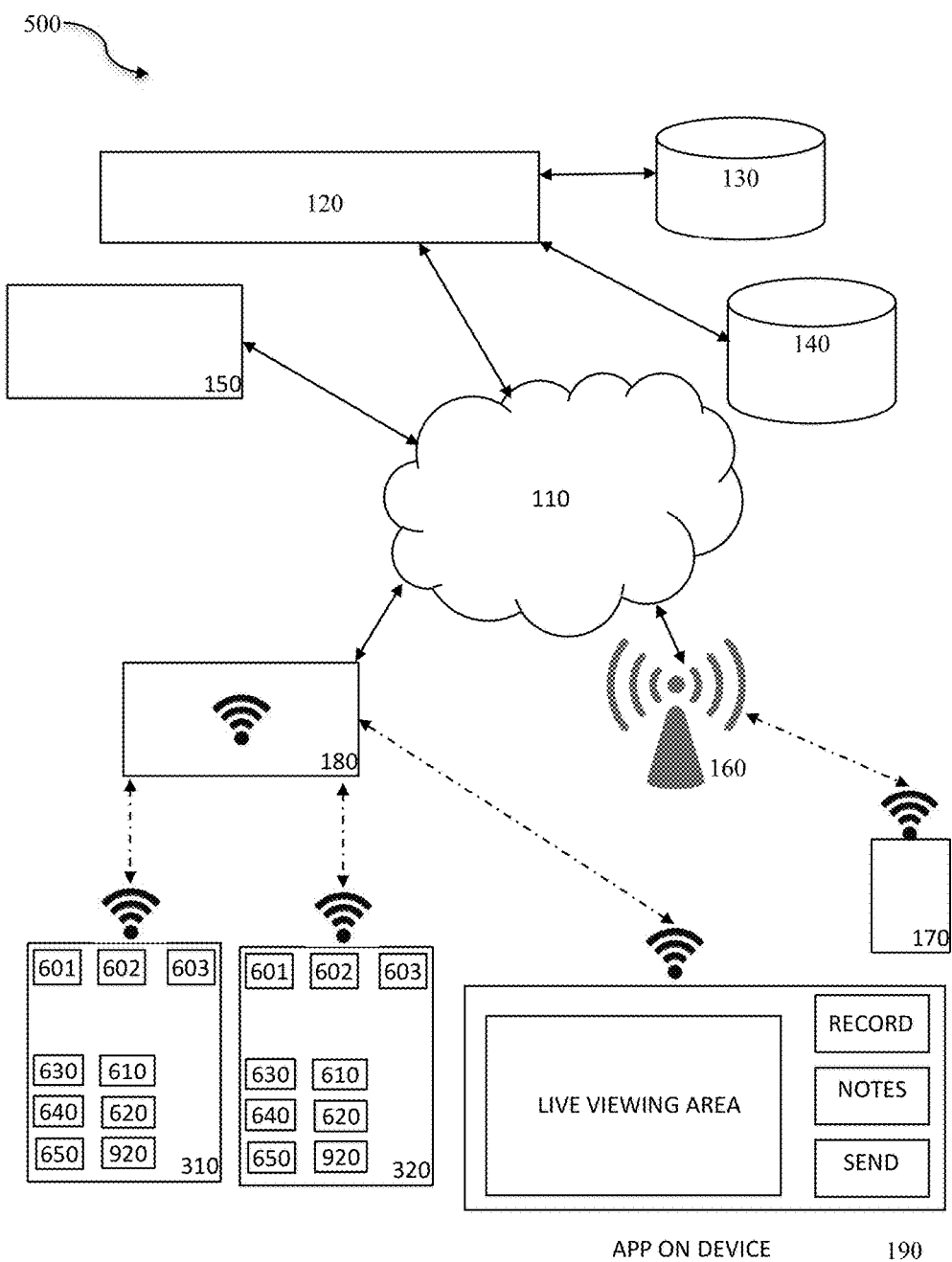
FIG. 5 is a schematic diagram of one embodiment of the invention.

FIGS. 3-5 illustrate schematic diagrams of different embodiments of the present invention; like reference indicators are used throughout the multiple figures for the same or similar elements, as appropriate. FIG. 3 shows one embodiment of a cloud-based video surveillance system 300. The embodiment shows a CPU processor and/or server computer 120 in network-based communication with at least one database 130 and at least one geographically redundant database 140. The server computer 120 is connected to a network 110, a communications (wired and/or wireless) router 180, communications tower 160, and a user device 150 are also connected to the network 110. A user device 170 is connected to the network 110 via the communication tower 160. A user device 190 and two ICDs 310 and 320 are connected to the router 180 in a local area network via Wi-Fi wireless 601, cellular wireless 602, or Bluetooth wireless 603. Each of the two ICDs may include image capture 610, video capture 620, audio capture 630, text and audio note 640, and/or geo-location 650 technologies, each technology capable of collecting data for upload to the network 110 and storage on the databases 130, 140. As the user device 190 may also contain identity technologies 920, such as facial, fingerprint and/or retina recognition, both databases 130, 140 may include identity database for validating fingerprints, facial recognition, and/or retina recognition. User devices 150 and 170, being any computer, tablet, smartphone, or similar device, permits user access to the data, video, image, and audio storage on the cloud.

FIG. 4 illustrates another embodiment 400 of a cloud-based video surveillance system providing for the components shown. A communications router 180 is connected with the network via communication tower 160.

FIG. 5 illustrates another cloud-based video surveillance system 500 with the components shown, including a software application or app on a computing device having a graphic user interface (GUI) providing for a live viewing area on the device and function buttons, virtual buttons (i.e., touch-activated, near-touch-activated, etc.) of record, notes, and send, associated with input capture devices 190.

Figure 6:
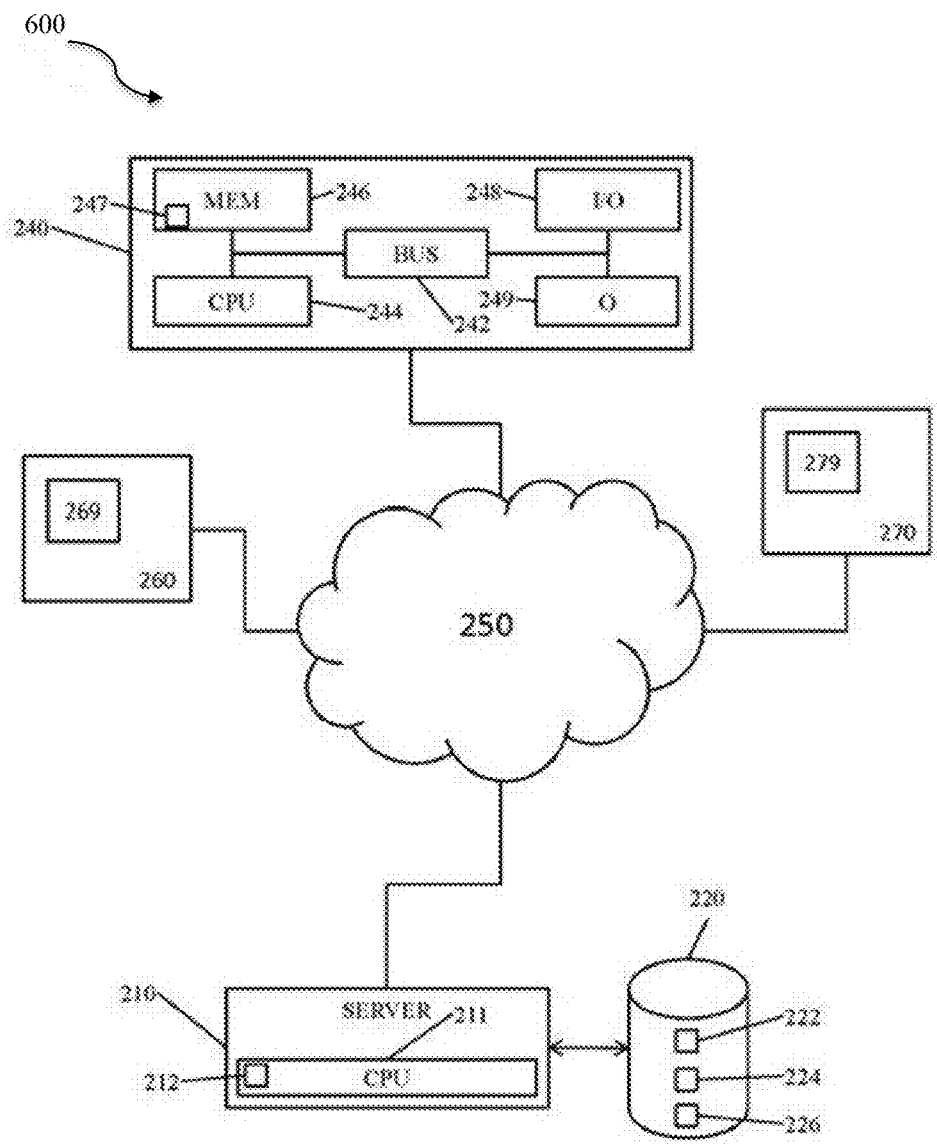
FIG. 6 is a schematic diagram of a cloud-based system of the present invention.

Referring now to FIG. 6, a schematic diagram 600 illustrating a virtualized computing network used in of one embodiment of the invention for automated systems and methods is shown. As illustrated, components of the systems and methods include the following components and sub-components, all constructed and configured for network-based communication, and further including data processing and storage. As illustrated in FIG. 6, a basic schematic of some of the key components of a financial settlement system according to the present invention are shown. The system 600 comprises a server 210 with a processing unit 211. The server 210 is constructed, configured and coupled to enable communication over a network 250. The server provides for user interconnection with the server over the network using a personal computer (PC) 240 positioned remotely from the server, the personal computer has instructions 247 stored in memory 246. There are other necessary components in the PC 240, for example, a CPU 244, BUS 242, Input/Output ("I/O") port 248, and an Output ("O") port 249. Furthermore, the system is operable for a multiplicity of remote personal computers or terminals 260, 270, having operating systems 269, 279. For example, a client/server architecture is shown. Alternatively, a user may interconnect through the network 250 using a user device such as a personal digital assistant (PDA), mobile communication device, such as by way of example and not limitation, a mobile phone, a cell phone, smart phone, laptop computer, netbook, a terminal, or any other computing device suitable for network connection. Also, alternative architectures may be used instead of the client/server architecture. For example, a PC network, or other suitable architecture may be used. The network 250 may be the Internet, an intranet, or any other network suitable for searching, obtaining, and/or using information and/or communications. The system of the present invention further includes an operating system 212 installed and running on the server 210, enabling server 210 to communicate through network 250 with the remote distributed user devices. The operating system may be any operating system known in the art that is suitable for network communication as described herein below. Data storage 220 may house an operating system 222, memory 224, and programs 226.

Figure 7:
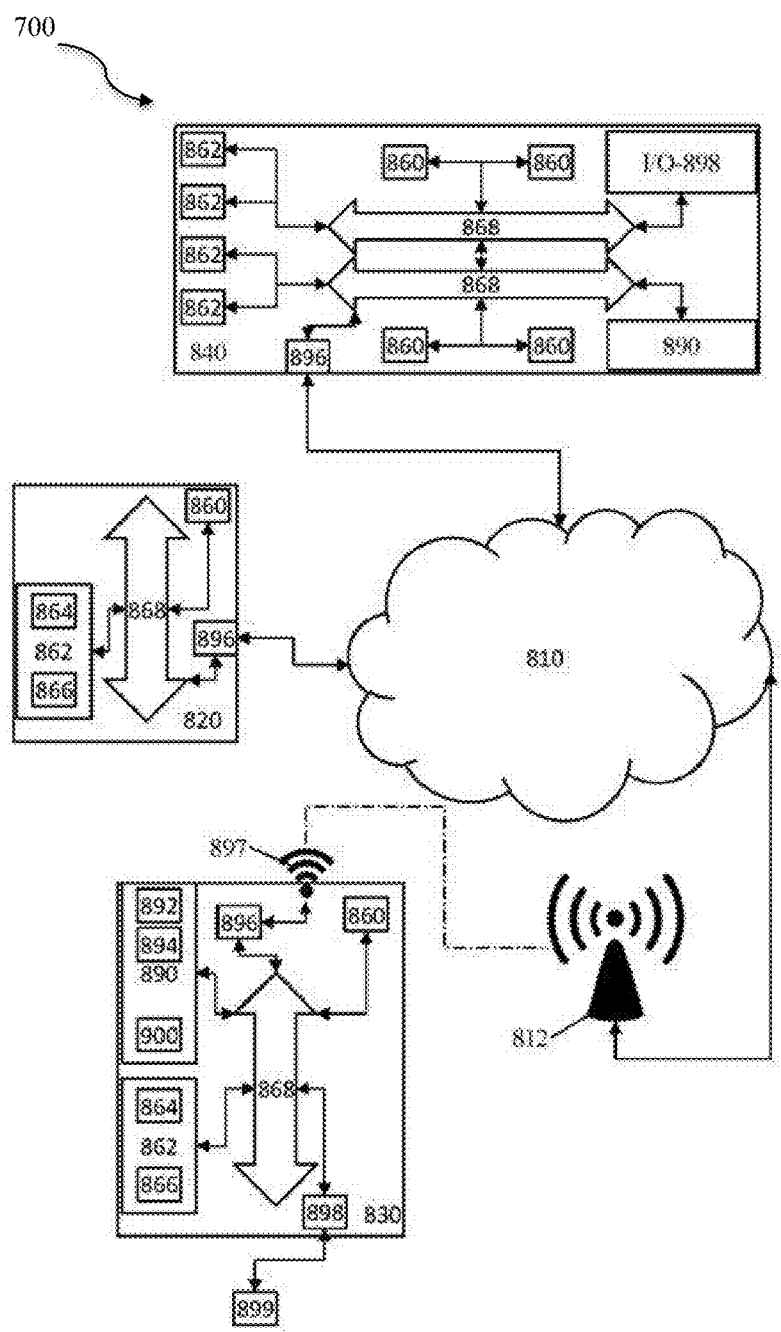
FIG. 7 is another schematic diagram of a cloud-based system of the present invention.

Additionally or alternatively to FIG. 6, FIG. 7 is a schematic diagram of an embodiment of the invention illustrating a computer system, generally described as 700, having a network 810 and a plurality of computing devices 820, 830, 840. In one embodiment of the invention, the computer system 800 includes a cloud-based network 810 for distributed communication via the network's wireless communication antenna 812 and processing by a plurality of mobile communication computing devices 830. In another embodiment of the invention, the computer system 800 is a virtualized computing system capable of executing any or all aspects of software and/or application components presented herein on the computing devices 820, 830, 840. In certain aspects, the computer system 700 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers and mobile devices, such as a server, blade server, mainframe, mobile phone, a personal digital assistant (PDA), a smart phone, a desktop computer, a netbook computer, a tablet computer, a workstation, a laptop, and other similar computing devices. The components shown here, their connections and relationships, and their functions, are meant to be exemplary only, and are not meant to limit implementations of the invention described and/or claimed in this document.

In one embodiment, the user device 820 includes components such as a processor 860, a system memory 862 having a random access memory (RAM) 864 and a read-only memory (ROM) 866, and a user bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown in FIG. 7, a computing device 840 may use multiple processors 860 and/or multiple buses 868, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multi-processor system). Alternatively, some steps or methods may be performed by circuitry that is specific to a given function.

According to various embodiments, the computer system 700 may operate in a networked environment using logical connections to local and/or remote computing devices 820, 830, 840, 850 through a network 810. A computing device 830 may connect to a network 810 through a network interface unit 896 connected to the bus 868. Computing devices may communicate communication media through wired networks, direct-wired connections or wirelessly such as acoustic, RF or infrared through a wireless communication antenna 897 in communication with the network's wireless communication antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that can be used to store the computer readable instructions and which can be accessed by the computer system 700.

It is also contemplated that the computer system 700 may not include all of the components shown in FIG. 7, may include other components that are not explicitly shown in FIG. 7, or may utilize an architecture completely different than that shown in FIG. 7. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. By way of example and not limitation, the present invention systems and methods may further include automated web-based searching to identify and analyze similar images and/or videos (or content, individuals, objects, and combinations thereof in the images and/or videos) from social websites or social media postings to associate, link, supplement and/or match with the at least one input authenticated and received by the cloud-based server(s) and corresponding to a surveillance environment, a surveillance event, and/or a surveillance target within a predetermined timeframe. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A method for connecting an input capture device to a cloud platform, comprising:
   communicatively connecting a local computing device and the input capture device to a local communication network via a network device, wherein the input capture device includes one or more environment sensors;
   the local computing device querying the network device;
   the local computing device identifying the input capture device;
   the local computing device configuring the input capture device for communicating with the cloud platform, wherein the input capture device is configured to send, via a communication path, environmental data to the cloud platform, wherein the local computing device is not part of the communication path;
   the input capture device communicating the environment data to the cloud platform, wherein the environmental data includes one or more of audio data, video data, motion data, or still images;
   wherein the environment data on the cloud platform are accessible by the local computing device locally and/or other authorized computing devices; and
   wherein the environment data on the cloud platform are accessible by the other authorized computing devices even when the local computing device is powered off.

2. The method of claim 1, wherein the local computing device and the other authorized computing devices are selected from the group consisting of: personal computers, laptops, tablets, smartphones, game consoles, and smart TVs.

3. The method of claim 1, wherein the input capture device is selected from the group consisting of: doorbells with embedded cameras, refrigerators with embedded cameras, ovens with embedded cameras, thermostats with embedded cameras, and cars with embedded cameras.

4. The method of claim 1, further comprising installing and activating an application program associated with the cloud platform on the local computing device.

5. The method of claim 4, wherein the application program has a cloud-based account associated with the cloud platform.

6. The method of claim 5, further comprising accessing the input capture device over the cloud platform with the cloud-based account.

7. The method of claim 5, wherein each of the environment sensors of the input capture device has a unique identifier, and wherein each of at least one environment sensor is accessible under the cloud-based account associated with the cloud platform.

8. The method of claim 1, further comprising providing cloud-based video analytics by the cloud platform.

9. The method of claim 1, further comprising storing visual data from the input capture device on the cloud platform.

10. The method of claim 9, further comprising selecting a time period for data storage on the cloud platform.

11. A system for cloud-based surveillance, comprising:
   an input capture device with at least one environment sensor and configured to communicate with a local computing device;
   wherein the input capture device and the local computing device are communicatively connected to a local communication network via a network device;
   wherein the local computing device is operable to:
     query the network device;
     identify the input capture device; and
     configure the input capture device for communicating with a cloud platform,
   wherein the input capture device is operable to communicate, via a communication path, environment data obtained by the input capture device to the cloud platform,
     wherein the local computing device is not part of the communication path,
     wherein the environment data includes one or more of visual data or audio data originated from the input capture device,
     wherein the environment data on the cloud platform are accessible by the local computing device locally and/or by other authorized computing devices, and
     wherein the environment data on the cloud platform are accessible by other authorized computing devices even when the local computing device is powered off.

12. The system of claim 11, wherein the local computing device and the other authorized computing devices are selected from the group consisting of: personal computers, laptops, tablets, smartphones, game consoles, and smart TVs.

13. The system of claim 11, wherein the input capture device is selected from the group consisting of: doorbells with embedded cameras, refrigerators with embedded cameras, ovens with embedded cameras, thermostats with embedded cameras, and cars with embedded cameras.

14. The system of claim 11, wherein an application program associated with the cloud platform is installed and activated on the local computing device.

15. The system of claim 14, wherein the application program has a cloud-based account associated with the cloud platform.

16. The system of claim 15, wherein the local computing device and other authorized devices access to the device over the cloud platform with the cloud-based account.

17. The system of claim 15, wherein each of the at least one environment sensor on the input capture device has a unique identifier, and wherein each of the at least one environment sensor is accessible under the cloud-based account associated with the cloud platform.

18. The system of claim 11, wherein the cloud platform provide analytics for the visual data.

19. The system of claim 11, wherein the cloud platform provides storage for the visual data.

20. The system of claim 19, wherein a time period for data storage over the cloud platform is selectable.

21. The method of claim 1, wherein the cloud platform includes one or more remote data storage devices.

22. The method of claim 1, wherein configuring the input capture device for communicating with the cloud platform includes sending instructions for establishing communication between the input capture device and the cloud platform from the local computing device to the input capture device via the local communication network.

23. The method of claim 1, wherein the environmental data includes audio data.

24. The method of claim 1, wherein the environmental data includes video data.

25. The method of claim 1, wherein the environmental data includes motion data.

26. The method of claim 1, wherein the environmental data includes still images.

27. The system of claim 11, wherein one or more applications unrelated to connecting the input capture device to the cloud platform are installed on the local computing device.

* * * * *